United States Patent
Isogai et al.

(10) Patent No.: US 8,659,192 B2
(45) Date of Patent: Feb. 25, 2014

(54) ROTARY ELECTRICAL APPARATUS

(75) Inventors: Shigetaka Isogai, Nishio (JP); Keiichiro Kawashima, Okazaki (JP); Takashi Ishibashi, Kariya (JP); Masahiro Omura, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 337 days.

(21) Appl. No.: 13/232,116

(22) Filed: Sep. 14, 2011

(65) Prior Publication Data

US 2012/0068562 A1 Mar. 22, 2012

(30) Foreign Application Priority Data

Sep. 16, 2010 (JP) .................. 2010-207706
Sep. 16, 2010 (JP) .................. 2010-207709
Sep. 16, 2010 (JP) .................. 2010-207710

(51) Int. Cl.
*H02K 9/19* (2006.01)
(52) U.S. Cl.
USPC .............................. 310/54; 310/60 R; 310/64
(58) Field of Classification Search
USPC .................. 310/52–54, 57–59, 60 R, 60 A, 64
See application file for complete search history.

(56) References Cited

U.S. PATENT DOCUMENTS

| 3,149,478 | A | * | 9/1964 | Anderson et al. | ................ | 62/469 |
| 4,600,848 | A | * | 7/1986 | Sutrina et al. | ................... | 310/54 |
| 6,341,489 | B1 | | 1/2002 | Iida | | |
| 2012/0242178 | A1 | * | 9/2012 | Miyamoto et al. | .............. | 310/54 |

FOREIGN PATENT DOCUMENTS

| JP | 2000-203293 A | 7/2000 |
| JP | 2005-201316 A | 7/2005 |
| JP | 2008-286247 A | 11/2008 |

\* cited by examiner

*Primary Examiner* — Dang Le
(74) *Attorney, Agent, or Firm* — Buchanan Ingersoll & Rooney PC (57) ABSTRACT

A rotary electrical apparatus includes a housing, a stator including a center axis inclined by a predetermined angle relative to a horizontal direction in a case where the housing is fixed to a mounting member, a rotor, and an oil stored at a lower side within the housing relative to the center axis and functioning as at least one of a cooling oil, a lubricating oil, and an operating oil. The housing includes an oil inlet port and an oil discharge port allowing the oil to be discharged once a predetermined amount of the oil is stored within the housing, the oil discharge port being displaced from a first oil passage on which the oil supplied from the oil inlet port moves downward along an inner peripheral wall surface of the housing in a state where the housing is held so that the center axis is arranged to be horizontal.

10 Claims, 8 Drawing Sheets

ROTARY ELECTRICAL APPARATUS

CROSS REFERENCE TO RELATED APPLICATIONS

This application is based on and claims priority under 35 U.S.C. §119 to Japanese Patent Application 2010-207706, filed on Sep. 16, 2010, Japanese Patent Application 2010-207709, filed on Sep. 16, 2010, and Japanese Patent Application 2010-207710, filed on Sep. 16, 2010, the entire contents of which are incorporated herein by reference.

TECHNICAL FIELD

This disclosure generally relates to a rotary electrical apparatus.

BACKGROUND DISCUSSION

A known rotary electrical apparatus includes a housing in which a stator and a rotor are accommodated and in which oil is stored. Such rotary electrical apparatus is disclosed in JP2008-286247A (hereinafter referred to as Reference 1). In Reference 1, it is stated that, in a case where an amount of oil stored in the housing increases, a stirring resistance of the rotor increases. The increase of stirring resistance leads to a decrease in efficiency of the rotary electrical apparatus. On the other hand, in a case where the amount of oil stored in the housing decreases, a function of oil may not be sufficiently exercised. For example, a cooling performance, a lubricating performance and/or an operation pressure by the oil may decrease. Thus, it is important to adjust or control the amount of oil stored in the housing within a predetermined range.

According to JP2000-203293A (hereinafter referred to as Reference 2) and JP2005-201316A (hereinafter referred to as Reference 3) in addition to Reference 1, plural areas or portions for storing the oil are provided. An additional storage area besides a main storage area where the stator and the rotor are provided is formed to thereby control the amount of oil in the main storage area within the predetermined range.

In a case where the additional storage area as disclosed in References 1 to 3 is not provided, an oil discharge port may be formed at the housing at a predetermined height from an inner bottom portion of the housing. In such case, an operator puts the oil from an oil inlet port formed at the housing and determines that the desired amount of oil is stored in the housing when the oil is discharged from the oil discharge port. However, depending on positions of the oil inlet port and the oil discharge port, the oil may be discharged from the oil discharge port even when the desired amount of oil is not stored in the housing.

A need thus exists for a rotary electrical apparatus which is not susceptible to the drawback mentioned above.

SUMMARY

According to an aspect of this disclosure, a rotary electrical apparatus includes a housing, a stator fixed within the housing and including a center axis being inclined by a predetermined angle relative to a horizontal direction in a case where the housing is fixed to a mounting member, a rotor accommodated within the housing and provided to face the stator in a radial direction of the stator, the rotor being rotatable relative to the stator at the center axis, and an oil stored at a lower side within the housing relative to the center axis of the stator and the rotor and functioning as at least one of a cooling oil, a lubricating oil, and an operating oil within the housing. The housing includes an oil inlet port allowing the oil to be supplied to the housing and an oil discharge port allowing the oil to be discharged to an outside of the housing once a predetermined amount of the oil is stored within the housing, the oil discharge port being displaced from a first oil passage on which the oil supplied from the oil inlet port moves downward along an inner peripheral wall surface of the housing in a state where the housing is held so that the center axis of the stator is arranged to be horizontal.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
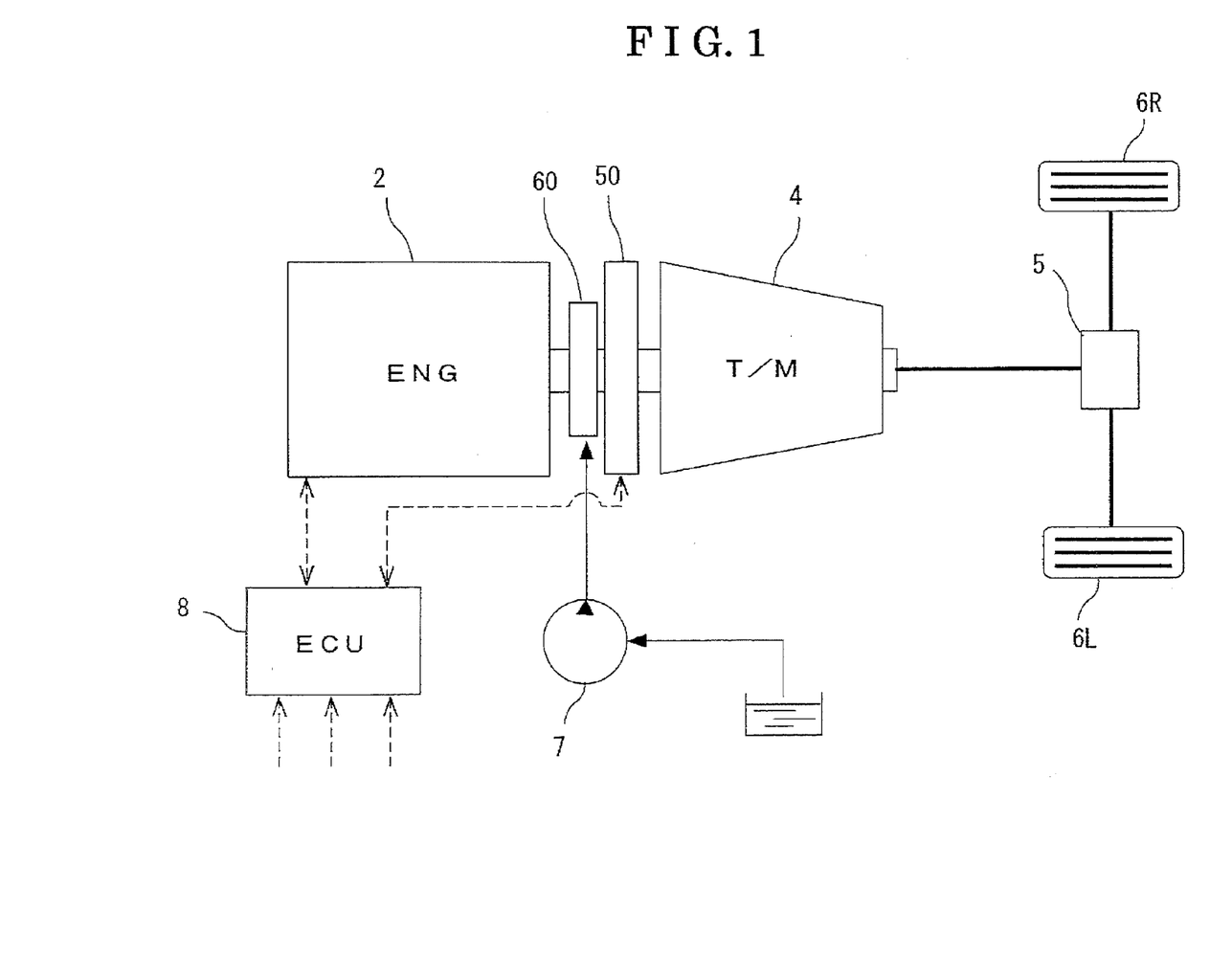
FIG. 1 is a schematic view illustrating a power-train of a hybrid vehicle including a drive unit for the hybrid vehicle according to an embodiment disclosed here.

A rotary electrical apparatus of an embodiment is applied to a drive unit for a hybrid vehicle, for example. A power train of the hybrid vehicle including the drive unit for the hybrid vehicle will be explained with reference to FIG. 1. In FIG. 1, wide full lines indicate a mechanical connection of the vehicle and arrows in narrow full lines indicate a hydraulic piping that connect members or units one another. In addition, arrows in narrow broken lines indicate control signal lines.

As illustrated in FIG. 1, the power train includes an internal combustion engine 2 and an electric motor 50 serving as the drive unit for the hybrid vehicle. The internal combustion engine 2, serving as a mounting member, is connected to the electric motor 50 in series via a clutch device 60 including a wet multi-plate clutch. A vehicle transmission (hereinafter simply referred to as a transmission) 4 is connected to the electric motor 50 in series. A right driving wheel 6R and a left driving wheel 6L for the vehicle are connected to the transmission 4 via a differential unit 5.

The internal combustion engine 2 includes a normal configuration so as to produce an output from hydrocarbon fuel. The electric motor 50 is a synchronous motor for driving the wheels. The transmission 4 is a known automatic transmission. The clutch device 60 is a normally closed clutch device normally connecting the internal combustion engine 2 and the electric motor 50 to each other. The clutch device 60 allows and prohibits a torque transmission between the internal combustion engine 2 and the transmission 4.

According to the vehicle including the aforementioned power train, in a case where the vehicle is driven by the internal combustion engine 2, the internal combustion engine 2 causes the driving wheels 6R and 6L to rotate via the transmission 4. In a case where the vehicle is driven by the electric motor 50, the electric motor 50 causes the driving wheels 6R and 6L to rotate via the transmission 4. In a case where the vehicle is driven only by the electric motor 50, the operation of the internal combustion engine 2 is stopped and the clutch device 60 is brought into a disconnected state so as to release or disengage the connection between the internal combustion engine 2 and the electric motor 50 (i.e., to disconnect the internal combustion engine 2 and the electric motor 50 from each other). Further, the electric motor 50 is driven by the driving wheels 6R and 6L in a state where the electric motor 50 disengages from the internal combustion engine 2 by the clutch device 60. The electric motor 50 also function as a power generator accordingly.

A discharge port of an electric pump 7 is connected to a hydraulic chamber PC (see FIG. 2) of the clutch device 60. A controller 8 is electrically connected to the electric pump 7. The controller 8 controls a connection state of the clutch device 60 by operating the electric pump 7 so as to supply pressure oil to the hydraulic chamber PC of the clutch device 60. The internal combustion engine 2 and the electric motor 50 are connected to the controller 8. Further, detection signals of an accelerator position sensor, a vehicle speed sensor, and a shift switch of the transmission 4 are input to the controller 8. The controller 8 controls operations of the electric motor 50, the internal combustion engine 2, and the clutch device 60 based on an operation of an accelerator pedal of the vehicle, and the like.

The aforementioned electric motor 50 and the clutch device 60 constitute a unit as the rotary electrical apparatus. Detailed configurations of the rotary electrical apparatus will be explained with reference to FIG. 2. In the following, an axial direction indicates a direction of a center axis C of the electric motor 50, i.e., the center axis C of a stator 51 and a rotor 52. At this time, in a state where the rotary electrical apparatus is mounted on the vehicle, i.e., the rotary electrical apparatus is fixed to the internal combustion engine 2, the center axis C of the electric motor 50 is not equal to a horizontal direction and is slightly inclined (i.e., inclined by 5 degrees or less) from the horizontal direction. In a case of a manufacture of the rotary electrical apparatus, the rotary electrical apparatus is held so that the axial direction of the electric motor 50 corresponds to the horizontal direction.

Figure 2:
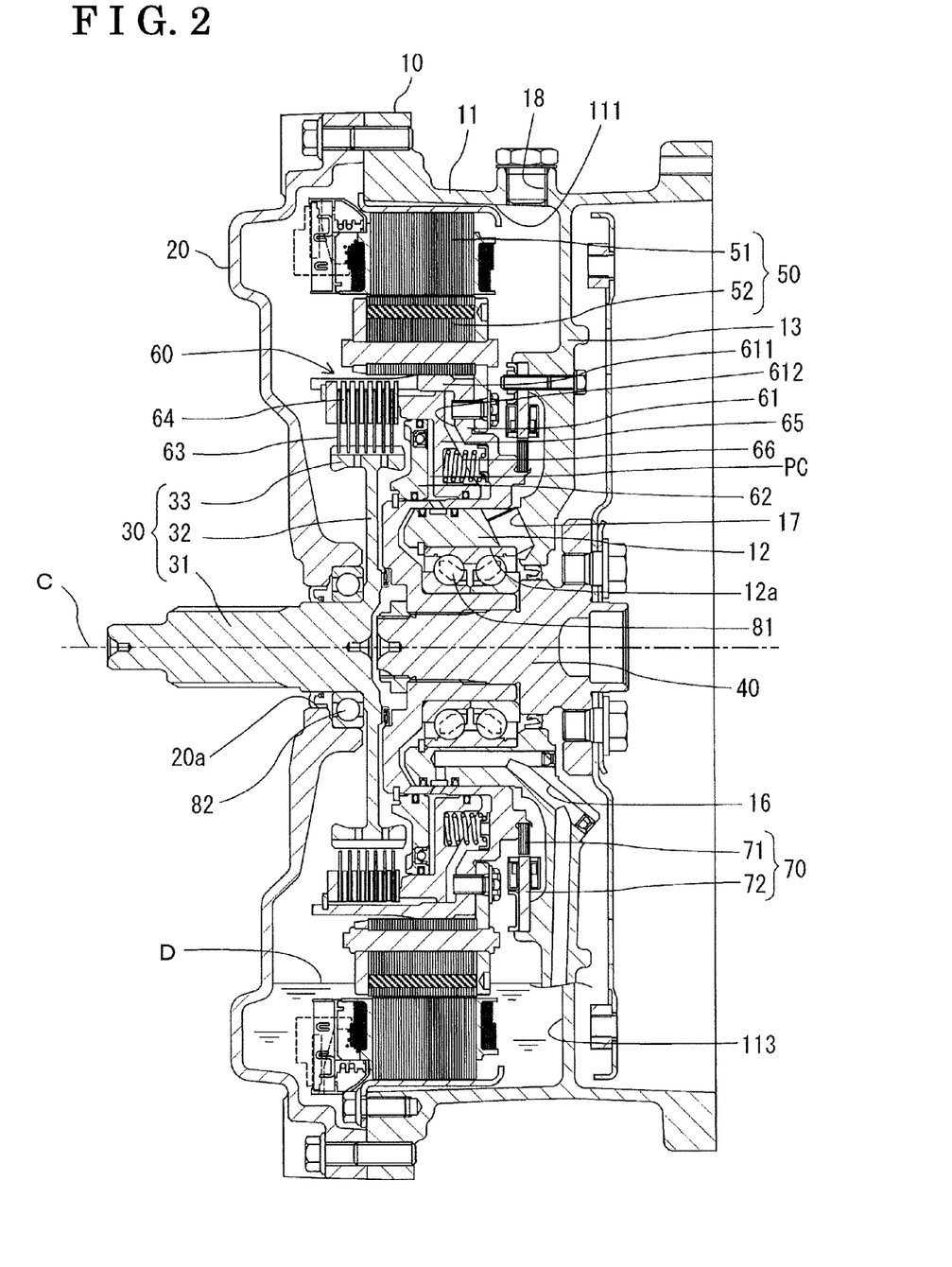
FIG. 2 is an axial cross-sectional view of a rotary electrical apparatus according to the embodiment.

As illustrated in FIG. 2, the rotary electrical apparatus includes a first housing 10, a second housing 20, an input shaft 30, an output shaft 40, the electric motor 50, the clutch device 60, and a rotational position sensor 70.

The first housing 10 is formed into a cup shape made of aluminum alloy, for example. Specifically, the first housing 10 integrally includes an outer peripheral cylinder portion 11, an inner peripheral boss portion 12, and a disc portion 13 connecting the outer peripheral cylinder portion 11 and the inner peripheral boss portion 12. A circular bore 12a is formed at a center of the inner peripheral boss portion 12. In addition, a circular bore 20a is formed at a center of the second housing 20 that is formed into a cup shape having a short axial length.

As illustrated in FIG. 2, an end surface of the outer peripheral cylinder portion 11 of the first housing 10 at an open side of the cup shape of the outer peripheral cylinder portion 11 (i.e., a left side in FIG. 2), and an end surface of an outer peripheral edge of the second housing 20 at an open side of the cup shape of the second housing 20 (i.e., a right side in FIG. 2) are joined to each other to thereby form an internal space. The internal space constitutes a closed space in a state where the input shaft 30 and the output shaft 40 are attached to the first housing 10 and the second housing 20. The internal space defined by the first and second housings 10 and 20 will be hereinafter referred to as a housing internal space.

The electric motor 50, the clutch device 60, and the rotational position sensor 70 are accommodated in the housing internal space. The internal combustion engine 2 is arranged at a vehicle front side (i.e., the left side in FIG. 2) of the second housing 20 while the transmission 4 is arranged at a vehicle rear side (i.e., the right side in FIG. 2) of the first housing 10. The first and second housings 10 and 20 are fixed to the internal combustion engine 2 so as to be fixed to a vehicle body.

In the case of manufacturing the rotary electrical apparatus, the first and second housings 10 and 20 are joined to each other in substantially the horizontal direction as illustrated in FIG. 2. Accordingly, at the manufacture, an up and down direction (a vertical direction) of the housing internal space corresponds to an up and down direction (a vertical direction) in FIG. 2. However, in a state where the rotary electrical apparatus is mounted on the internal combustion engine 2, a right side of the rotary electrical apparatus (a portion where the first housing 10 is provided, i.e., the vehicle rear side) in FIG. 2 is inclined downwardly by approximately 4 to 5 degrees, i.e., inclined by a predetermined angle, relative to the state illustrated in FIG. 2.

As illustrated in FIG. 2, an oil D is stored at a lower side (i.e., in a gravity direction) of the housing internal space. In order to bring the oil D stored in the first housing 10 to function as cooling oil, lubricating oil, and operating oil, for example, oil passages 16 and 17 are appropriately formed at the first housing 10. The oil passage 16 is provided so that the oil D is circulated to the hydraulic chamber PC from a storage portion of the oil D at the lower side of the housing internal space by the electric pump 7 (see FIG. 1) through the inner peripheral boss portion 12 formed at the center of the first housing 10. That is, the oil supplied to the hydraulic chamber PC via the oil passage 16 functions as the operating oil of the clutch device 60. The oil passage 17 is provided so as to supply the oil D to a bearing 81 (which will be explained later)

via the oil passage 16. That is, the oil supplied to the bearing 81 by the oil passage 17 functions as the lubricating oil and the cooling oil of the bearing 81.

Oil is injected to the housing internal space so that a predetermined amount of oil is stored in the housing internal space. In doing so, an oil inlet port 18 and an oil discharge port 19 (see FIG. 3) are formed at the first housing 10. Details of the oil inlet port 18 and the oil discharge port 19 will be explained later.

The input shaft 30 is connected to an output-side member (for example, a flywheel) of the internal combustion engine 2 so that a driving force of the internal combustion engine 2 is transmitted to the input shaft 30. The input shaft 30 includes a shaft main body 31, a disc portion 32, and a cylindrical-shaped clutch inner 33. The disc portion 32 that is integrally formed at one end side (i.e., a right side in FIG. 2) of the shaft main body 31 extends radially outwardly. The clutch inner 33 is integrally formed at an outer peripheral edge of the disc portion 32. The shaft main body 31 is rotatably supported by the circular bore 20a of the second housing 20 via a bearing 82. A groove is formed at an outer peripheral surface of the clutch inner 33 over an entire periphery thereof so as to extend in the axial direction. The shaft main body 31 of the input shaft 30 is positioned within the circular bore 20a of the second housing 20 so as to close the circular bore 20a. The disc portion 32 and the clutch inner 33 of the input shaft 30 are arranged within the housing internal space.

The output shaft 40 is a shaft member connected to the transmission 4 and is rotatably supported by an inner peripheral surface of the inner peripheral boss portion 12 of the first housing 10 via the bearing 81. The output shaft 40 functions as the member to be positioned within the circular bore 12a of the inner peripheral boss portion 12 of the first housing 10 so as to close the circular bore 12a.

The electric motor 50 includes the stator 51 and the rotor 52. The stator 51 is formed into an annular shape and is fixed to an inner peripheral side of the outer peripheral cylinder portion 11 of the first housing 10. The stator 51 includes a core formed by plural silicon steel plates and a coil wound on the core. In FIG. 2, the center axis C of the stator 51 is positioned to be horizontal. The center axis C of the stator 51 is horizontal in the case of manufacturing the rotary electrical apparatus. On the other hand, in a case of fixing the rotary electrical apparatus to the internal combustion engine 2, the center axis C of the stator 51 is slightly inclined (for example, inclined by 4 to 5 degrees) relative to the horizontal direction so that the right side in FIG. 2 is inclined downwardly. That is, the first and second housings 10 and 20 are fixed to the internal combustion engine 2 in a state where the center axis C of the stator 51 is slightly inclined (by 4 to 5 degrees).

The rotor 52 is formed into an annular shape and is provided so as to face an inner peripheral surface of the stator 51 at a radially inner side. The rotor 52 is coaxially and rotatably supported by the first housing 10 via a clutch outer 61 so as to be rotatable relative to the stator 51. The rotor 52 is formed by plural laminated steel plates that are riveted by a tightening pin. The rotor 52 includes plural field pole magnets.

The clutch device 60 transmits a driving force of the electric motor 50 directly to the output shaft 40 and transmits a driving force of the internal combustion engine 2 to the output shaft 40 depending on a clutch engagement force of the clutch device 60. The clutch device 60 is arranged at a radial clearance between an inner peripheral surface of the rotor 52 and an outer peripheral surface of the output shaft 40. The clutch device 60 includes the clutch outer 61, a fixed member 62, plural drive discs 63, plural driven plates 64, a piston member 65, and a spring 66.

The clutch outer 61 is integrally connected to the inner peripheral surface of the rotor 52. In addition, the clutch outer 61 is spline-fitted to the outer peripheral surface of the output shaft 40 so that the clutch outer 61 is rotatably supported at an inner peripheral side of the inner peripheral boss portion 12 of the first housing 10 via the bearing 81. That is, the clutch outer 61 rotates by the driving force of the rotor 52 to thereby transmit the driving force to the output shaft 40. A groove is formed at an inner peripheral surface of an outer peripheral cylinder portion 611 of the clutch outer 61 over an entire periphery thereof so as to axially extend. The inner peripheral surface of the outer peripheral cylinder portion 611 of the clutch outer 61 radially faces an outer peripheral surface of the clutch inner 33. Further, an annular recess groove 612 is formed in such a manner that the outer peripheral cylinder portion 611 forms an outer peripheral wall surface of the annular recess groove 612.

The fixed member 62 is fixed to the clutch outer 61 so as to close a radially inner portion of the annular recess groove 612 of the clutch outer 61 at an open side thereof (the left side in FIG. 2).

The plural drive discs 63 are each formed into an annular thin plate shape and are arranged at the outer peripheral surface of the clutch inner 33 of the input shaft 30 so as to overlap in the direction of the center axis C. The drive discs 63 are slidable in the direction of the center axis C and are inhibited to rotate relative to the clutch inner 33.

The driven plates 64 are each formed into an annular thin plate shape and are arranged at an inner peripheral surface of the clutch outer 61 so as to overlap in the direction of the center axis C. The driven plates 64 are slidable in the direction of the center axis C and are inhibited to rotate relative to the clutch outer 61. Further, each of the driven plates 64 is sandwiched between two of the drive discs 63, i.e., the drive discs 63 and the driven plates 64 are alternately arranged to one another in the direction of the center axis C.

The piston member 65 is provided at the annular recess groove 612 of the clutch outer 61 so as to be slidable in the direction of the center axis C relative to the clutch outer 61. A portion of the piston member 65 at an outer peripheral side is formed to project to the left side in FIG. 2 from a gap between the outer peripheral cylinder portion 611 of the clutch outer 61 at the open side and the fixed member 62. The spring 66 is disposed at an axial gap formed between the piston member 65 and the bottom of the annular recess groove 612 of the clutch outer 61. The spring 66 biases the piston member 65 in a first direction (i.e., the left direction in FIG. 2) of the center axis C. Accordingly, the piston member 65 is likely to move in the left direction in FIG. 2 by the biasing force of the spring 66.

The pressure oil is supplied by the electric pump 7 via the oil passage 16 to an axial gap formed between the piston member 65 and the fixed member 62, i.e., the hydraulic chamber PC. The oil D stored at the lower side of the housing internal space is used as the pressure oil. The pressure of the oil D supplied to the hydraulic chamber PC functions so that the piston member 65 is biased in a second direction (i.e., the right direction in FIG. 2) of the center axis C. Accordingly, the piston member 65 is likely to move in the right direction in FIG. 2 by the pressure of the oil D supplied to the hydraulic chamber PC. That is, the pressure of the oil D supplied to the hydraulic chamber PC is adjusted by the electric pump 7 to thereby control the position of the piston member 65 relative to the clutch outer 61 in the direction of the center axis C.

One axial end (i.e., the left end in FIG. 2) of the piston member 65 at the outer peripheral side is contactable with an end surface of the driven plate 64 or the drive disc 63. That is, the piston member 65 moves in the first direction of the center axis C (the left direction in FIG. 2) relative to the clutch outer 61 to thereby increase a frictional engagement force between the drive discs 63 and the driven plates 64. On the other hand, the piston member 65 moves in the second direction of the center axis C (the right direction in FIG. 2) relative to the clutch outer 61 to thereby decrease the frictional engagement force between the drive discs 63 and the driven plates 64.

The rotational position sensor 70 includes a movable body 71 provided at the clutch outer 61 and a detection body 72 provided at the disc portion 13 of the first housing 10. The rotational position sensor 70 detects a rotational position of the clutch outer 61 relative to the first housing 10, i.e., a rotational position of the rotor 52 relative to the first housing 10.

An operation of the rotary electrical apparatus having the aforementioned configuration will be explained below. In a case where the pressure of the oil D supplied to the hydraulic chamber PC of the clutch device 60 is low, the piston member 65 moves in the left direction in FIG. 2 by the biasing force of the spring 66. Then, the piston member 65 presses the drive discs 63 or the driven plates 64 to thereby increase the frictional engagement force between the drive discs 63 and the driven plates 64. In response to the frictional engagement force, the driving force of the internal combustion engine 2 is transmitted to the output shaft 40. In a case where the rotor 52 of the electric motor 50 is driven at the same time, the driving force of the rotor 52 is also transmitted to the output shaft 40 via the clutch outer 61.

On the other hand, in a case where the pressure of the oil D supplied to the hydraulic chamber PC increases, the piston member 65 moves in the right direction in FIG. 2 against the biasing force of the spring 66. Then, the frictional engagement force between the drive discs 63 and the driven plates 64 decreases. When the pressure of the oil D reaches a maximum, the frictional engagement between the drive discs 63 and the driven plates 64 is released. Accordingly, in the aforementioned state, even when the internal combustion engine 2 is driven, the driving force of the internal combustion engine 2 is inhibited from being transmitted to the output shaft 40. In a case where the rotor 52 of the electric motor 50 is driven at the same time, the driving force of the rotor 52 is directly transmitted to the clutch outer 61 to thereby rotate the output shaft 40.

At this time, because the rotor 52 of the electric motor 50 is slightly immersed in the oil D stored in the housing internal space, the oil D adhered to the rotor 52 is splattered upward in the housing internal space in association with the rotation of the rotor 52. The splattered oil D ensures the release of the engagement between the drive discs 63 and the driven plates 64 of the clutch device 6.

Next, details of the oil inlet port 18 and the oil discharge port 19 of the first housing 10 will be explained with reference to FIGS. 3 to 6. In FIGS. 3 to 6, for an easy explanation, the first housing 10 is schematically illustrated. Therefore, the shape of the first housing 10 illustrated in each of FIGS. 3 to 6 may not match the shape of the first housing 10 in FIG. 2.

Figure 3:
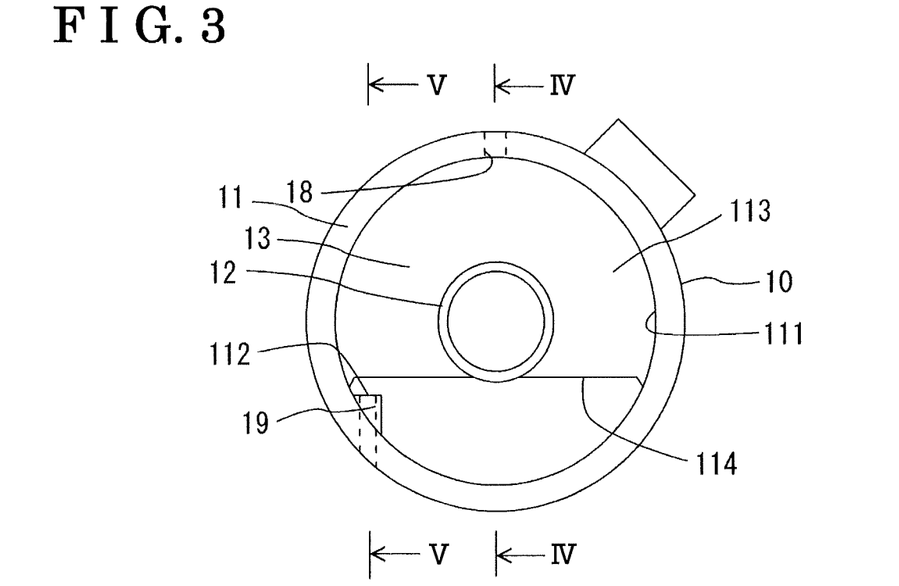
FIG. 3 is a schematic view of a first housing of the rotary electrical apparatus illustrated in FIG. 2 when viewed from an axial direction of the rotary electrical apparatus.
Figure 4:
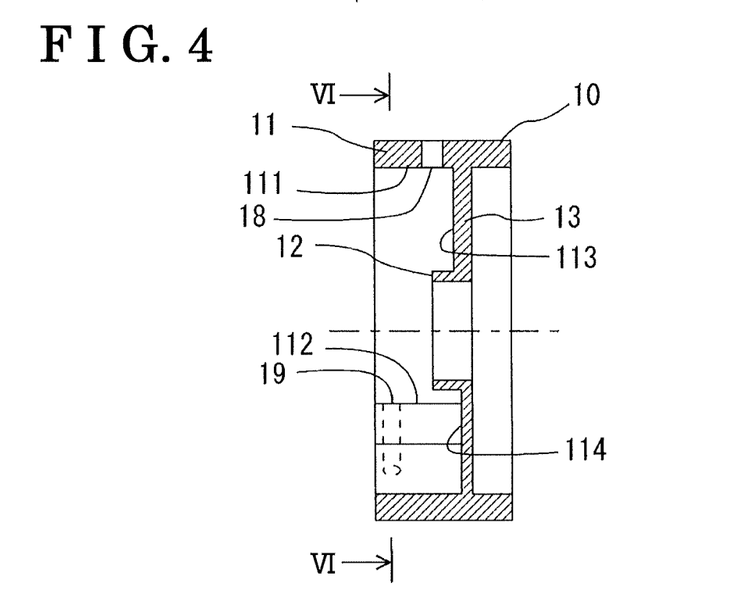
FIG. 4 is a cross-sectional view taken along the line IV-IV in FIG. 3.

As illustrated in FIGS. 3 and 4, the oil inlet port 18 connected to the outside of the first housing 10 is formed at an uppermost portion of an inner peripheral wall surface 111 of the first housing 10. The oil inlet port 18 allows the oil D to be injected to the housing internal space. In addition, a planar seat surface 112 is formed at the inner peripheral wall surface 111 of the first housing 10. Specifically, the planar seat surface 112 is arranged so as to be positioned lower than the center axis C of the electric motor 50 and so that a normal direction of the planar seat surface 112 faces upwardly. The planar seat surface 112 is formed in a planar shape in parallel to the center axis C of the electric motor 50. The oil discharge port 19 is formed at the planar seat surface 112 so as to allow oil to be discharged to the outside of the first housing 10 (the rotary electrical apparatus) once a predetermined amount of oil is stored in the housing internal space. That is, an opening portion of the oil discharge port 19 (which serves as an end surface of the oil discharge port) is positioned on a plane including the planar seat surface 112. Therefore, in a state where the center axis C of the electric motor 50 is positioned to be horizontal, the opening portion of the oil discharge port 19 is also substantially positioned on a horizontal flat surface.

Accordingly, in a case where the oil is injected from the oil inlet port 18 in a state where the first and second housings 10 and 20 are held so that the center axis C of the electric motor 50 is positioned to be horizontal at the time of the manufacture of the rotary electrical apparatus, the oil is discharged from the oil discharge port 19 after the surface of the stored oil D in the housing internal space reaches the height of the planar seat surface 112. At this time, the injection of the oil from the oil inlet port 18 is stopped and the oil inlet port 18 and the oil discharge port 19 are plugged. As a result, the amount of oil D stored in the housing internal space is highly accurately defined within a predetermined range.

The planar seat surface 112 is highly accurately formed by a die. As necessary, the surface of the planar seat surface 112 may be highly accurately formed by a cutting process. Thus, even when the oil discharge port 19 itself may not be highly accurately formed, the highly accurately-defined height of the planar seat surface 112 may result in the height of the opening portion of the oil discharge port 19 within a predetermined range. That is, the height of the opening portion of the oil discharge port 19 may be highly accurately defined. As a result, in a case where the oil is injected to the housing internal space until the oil starts to be discharged from the oil discharge port 19, the amount of oil D stored in the housing internal space is securely defined within the predetermined range. Specifically, without an additional storage area for storing the oil, the amount of oil D is securely defined within the predetermined range. As a result, the oil D securely functions as the cooling oil, the lubricating oil, the operating oil, and the like while an efficiency of the rotary electrical apparatus is maintained.

Figure 5:
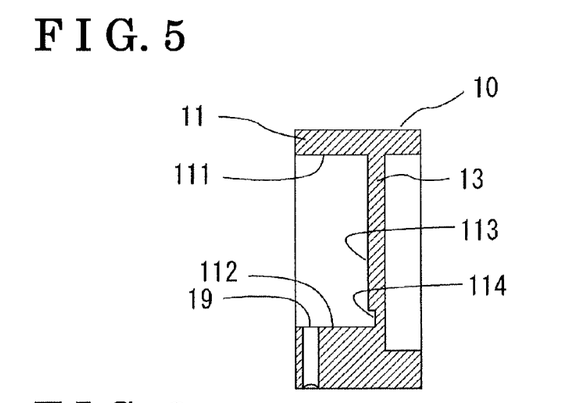
FIG. 5 is a cross-sectional view taken along the line V-V in FIG. 3.
Figure 6:
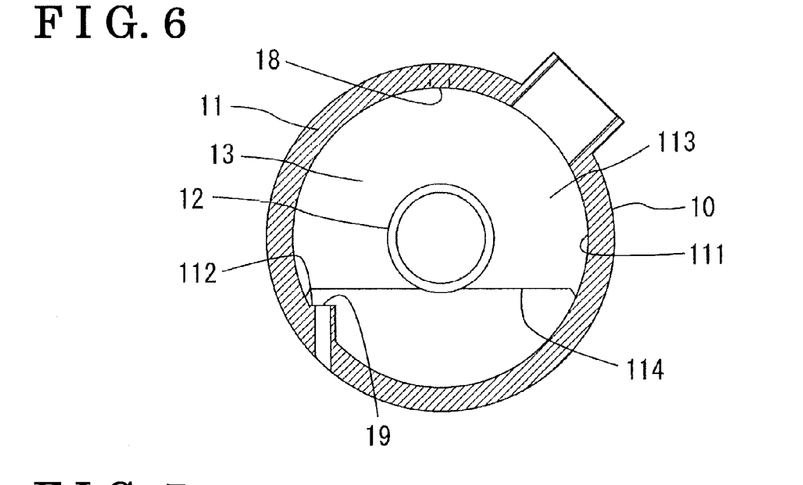
FIG. 6 is a cross-sectional view taken along the line VI-VI in FIG. 4.

As illustrated in FIGS. 3 to 5, the first housing 10 includes an axial end wall portion 113 serving as a wall surface facing axial end surfaces of the stator 51 and the rotor 52. Then, a storage recess portion 114 is formed at the axial end wall portion 113 at a range for storing the oil D in the first housing 10 so as to extend in the axial direction from an end surface of the axial end wall portion 113. The storage recess portion 114 is formed into a recess shape recessed to one side in the axial direction (in the right direction in FIG. 4). As illustrated in FIGS. 3 to 5, an upper boundary (an upper end) of the storage recess portion 114 is positioned higher than the planar seat surface 112.

In a case where the electric motor 50 is operated, the oil D stored in the housing internal space is heated by heat generated by the stator 51, for example. Then, the oil D is expanded. Because of the expansion of the oil D, a volume of the oil D increases so that the height of the surface of the oil D increases in the housing internal space. At this time, the upper boundary of the storage recess portion 114 is positioned at an upper side relative to the planar seat surface 112. Therefore, even when the volume of the oil D increases because of the expansion thereof, the height of the surface of the oil D is specified within a range of height of the storage recess portion 114. The height increase of the surface of the oil D, by which the rotor 52 is in contact with the oil, is restrained to thereby inhibit a decrease in efficiency of the rotary electrical apparatus.

Because the oil discharge port 19 is formed at the planar seat surface 112, the height of the opening portion of the oil discharge port 19 is highly accurately defined. As a result, the height of the storage recess portion 114 may be highly accurately defined to be higher than the height of the opening portion of the oil discharge port 19 by a predetermined amount. That is, the height of the surface of the oil D in a state where the oil D is not expanded is highly accurately defined. Therefore, the position of the upper boundary of the storage recess portion 114 is appropriately specified so that even when the oil D is expanded, the height of the surface of the oil D is specified within the range of the height of the storage recess portion 114.

Figure 7:
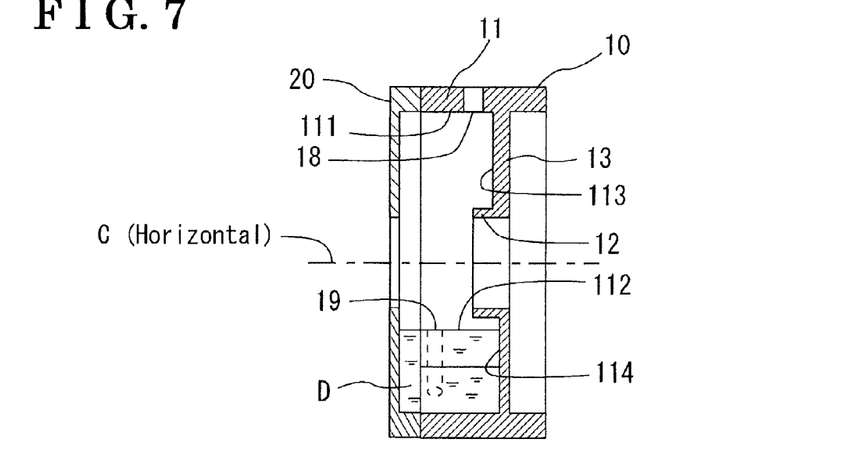
FIG. 7 is an axial cross-sectional view of the first housing and a second housing both of which are schematically illustrated in a state where a center axis of an electric motor is positioned to be horizontal according to the embodiment.
Figure 8:
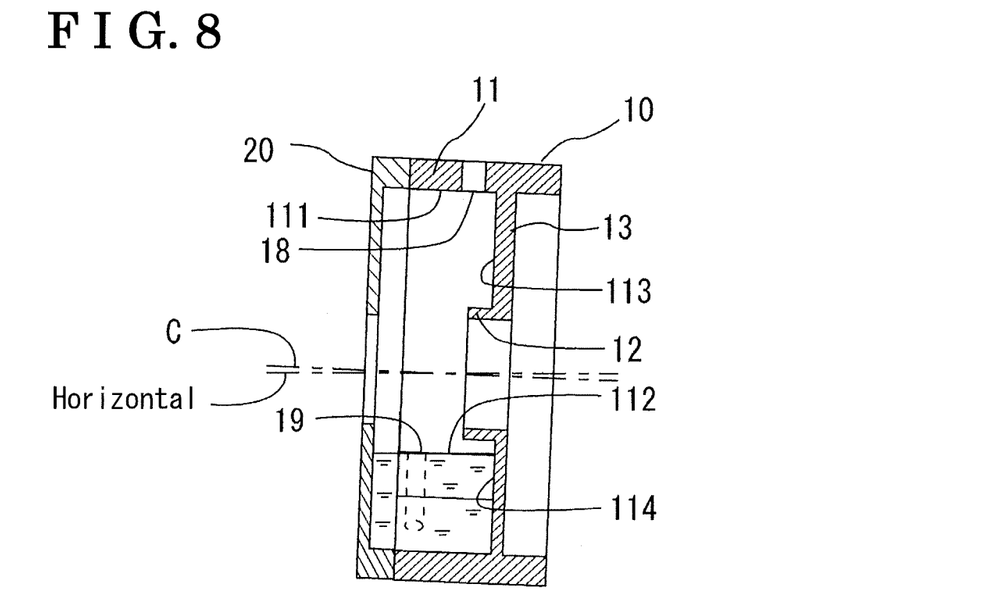
FIG. 8 is an axial cross-sectional view of the first housing and the second housing both of which are schematically illustrated in a state where the center axis of the electric motor is inclined relative to a horizontal direction according to the embodiment.

The position of the oil discharge port 19 in a case where the center axis C of the electric motor 50 is horizontal and a case where the center axis C of the electric motor 50 is inclined relative to the horizontal direction will be explained with reference to FIGS. 7 and 8. In FIGS. 7 and 8, for the easy explanation, the first housing 10 is schematically illustrated. Therefore, the shape of the first housing 10 illustrated in each of FIGS. 7 and 8 may not match the shape of the first housing 10 in FIG. 2.

As illustrated in FIG. 7, in a case of manufacturing the rotary electrical apparatus, the first and second housings 10 and 20 are held so that the center axis C of the electric motor 50 is positioned to be horizontal. On the other hand, as illustrated in FIG. 8, the first and second housings 10 and 20 are fixed to the internal combustion engine 2 in a state where the center axis C of the electric motor 50 is inclined by 4 to 5 degrees relative to the horizontal direction. Specifically, the rotary electrical apparatus is inclined so that the vehicle rear side thereof (the right side in FIG. 2) is positioned downwardly.

The oil is injected to the first housing 10 at the time of the manufacture of the rotary electrical apparatus. That is, in the early stage of the manufacture, the oil is injected from the oil inlet port 18 to the housing internal space in a state where the oil is dischargeable from the oil discharge port 19. The oil is stored in the housing internal space accordingly. At a time when the oil starts to be discharged from the oil discharge port 19, the injection of the oil to the housing internal space is stopped so that the predetermined amount of oil (the oil D) is stored in the housing internal space. At this time, as illustrated in FIG. 7, the surface of the oil D reaches the height of the planar seat surface 112. In the aforementioned state, a height from the opening portion of the oil discharge port 19 to the surface of the oil D is defined to be a reference height (i.e., a relative height between the opening portion of the oil discharge port 19 and the surface of the oil D).

After the rotary electrical apparatus is mounted on the vehicle, at a time of an inspection of the vehicle, for example, a process for storing the predetermined amount of oil in the housing internal space may be performed. That is, in a state where the center axis C of the electric motor 50 is inclined, the oil is again injected from the oil inlet port 18. At this time, the oil discharge port 19 is configured so that the oil is dischargeable from the oil discharge port 19. When the oil is discharged from the oil discharge port 19, it is regarded that the predetermined amount of oil is stored in the housing internal space. As mentioned above, the position of the center axis C of the electric motor 50 (i.e., the inclination of the rotary electrical apparatus) at the time of the manufacture and the position of the center axis C of the electric motor 50 at the time of the vehicle inspection are different from each other.

However, according to the present embodiment, when the oil is stored in the housing internal space while the oil is being dischargeable from the oil discharge port 19 in a state where the center axis C of the electric motor 50 (the stator 51) is inclined relative to the horizontal direction, the height from the opening portion of the oil discharge port 19 to the surface of the oil D is configured to be the same as the aforementioned reference height. That is, in order to position the surface of the oil D at a lower end of the opening portion of the oil discharge port 19 while the center axis C of the electric motor 50 is being positioned to be horizontal, the position of the oil discharge port 19 is determined so that, even when the center axis C of the electric motor 50 is inclined after the oil D is stored in the first housing 10, the surface of the oil D is also positioned at the lower end of the opening portion of the oil discharge port 19.

That is, the amount of oil D stored in the housing internal space is the same in both cases where the center axis C of the electric motor 50 is horizontal and inclined. Thus, the amount of oil D stored in the housing internal space in the early stage of the manufacture where the center axis C of the electric motor 50 is horizontal and the amount of oil D stored in the housing internal space at the vehicle inspection where the center axis C of the electric motor 50 is inclined may be equalized.

Figure 9:
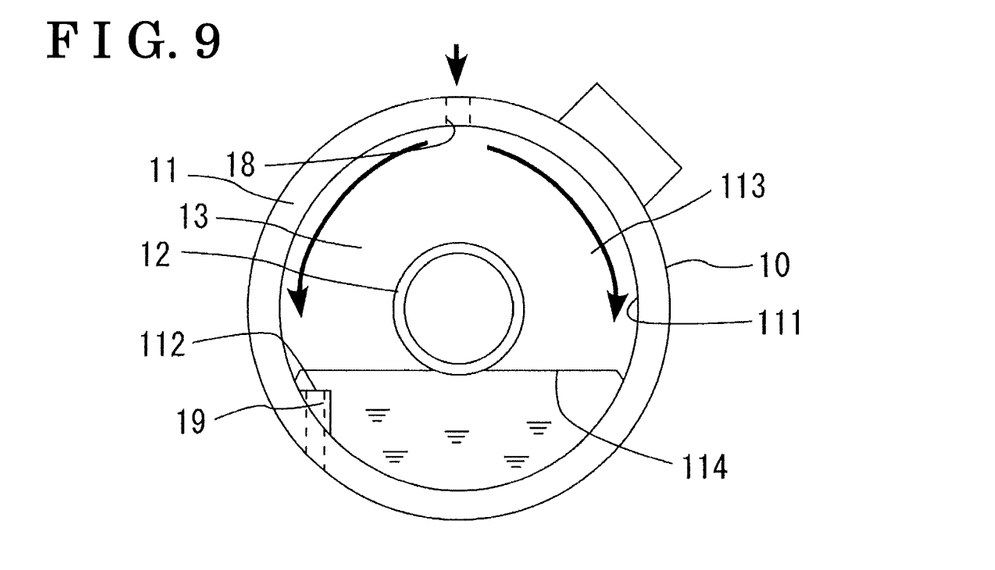
FIG. 9 is a schematic view of the first housing when viewed from the axial direction while illustrating a first example of a relative position between an oil inlet port and an oil discharge port of the rotary electrical apparatus.
Figure 10:
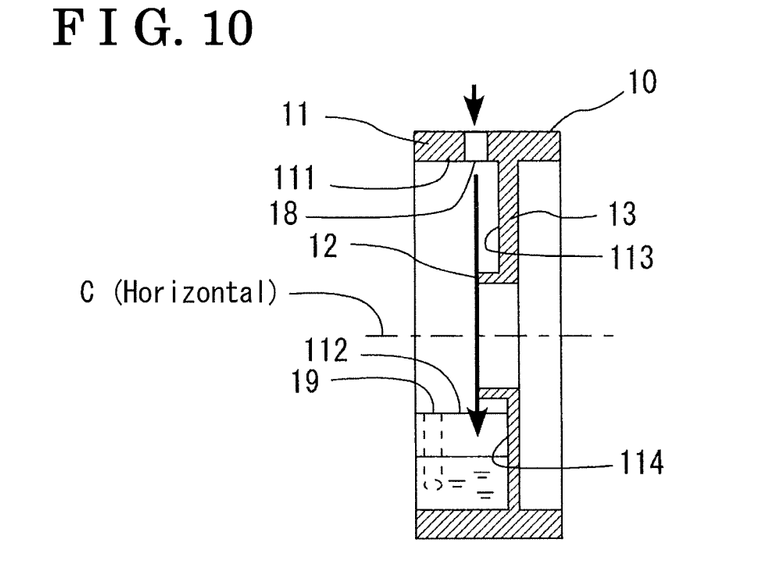
FIG. 10 is an axial cross-sectional view of the first housing illustrated in FIG. 9 in a state where the center axis of the electric motor is positioned to be horizontal according to the first example.
Figure 11:
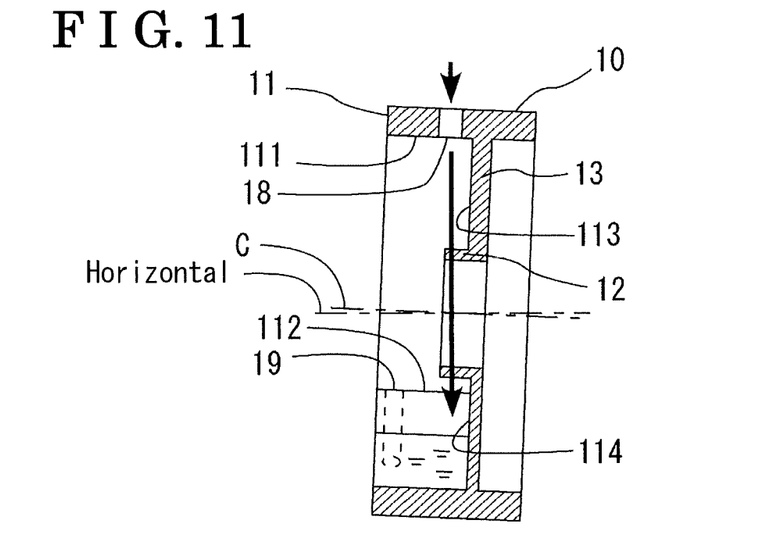
FIG. 11 is an axial cross-sectional view of the first housing illustrated in FIG. 9 in a state where the center axis of the electric motor is inclined relative to the horizontal direction according to the first example.

Next, a first example of a relative position between the oil inlet port 18 and the oil discharge port 19 will be explained with reference to FIGS. 9 to 11. In FIGS. 9 to 11, for the easy explanation, the first housing 10 is schematically illustrated. Therefore, the shape of the first housing 10 illustrated in each of FIGS. 9 to 11 may not match the shape of the first housing 10 in FIG. 2.

As illustrated in FIG. 9, the oil inlet port 18 is formed at the uppermost portion of the inner peripheral wall surface 111 of the first housing 10. As illustrated in FIGS. 10 and 11, the oil inlet port 18 is formed in the vicinity of the disc portion 13 at the inner peripheral wall surface 111 of the first housing 10 in the cross section including the center axis C.

On the other hand, the oil discharge port 19 is formed at the lower side of the center axis C of the electric motor 50 at the inner peripheral wall surface 111 as illustrated in FIG. 9. At this time, the opening portion of the oil discharge port 19 is provided upward by a predetermined amount relative to the lowest portion at the inner peripheral wall surface 111 of the first housing 10. Thus, the oil discharge port 19 is formed at a position circumferentially displaced relative to the lowest portion. As illustrated in FIGS. 10 and 11, the oil discharge port 19 is formed to be away from the disc portion 13 (i.e., formed at the open side of the first housing 10) at the inner peripheral wall surface 111 of the first housing 10. Consequently, the oil inlet port 18 and the oil discharge port 19 are displaced in the direction of the center axis C of the electric motor 50. Further, the oil discharge port 19 is arranged at a position deviated from an extension of a straight line (i.e., the oil discharge port 19 is positioned out of a straight line) extending from the oil inlet port 18 and intersecting with the center axis C of the electric motor 50. Furthermore, in the cross section of the first housing 10 by a vertical plane including the center axis C of the electric motor 50 (i.e., as illustrated in FIGS. 10 and 11), the position of the oil inlet port 18 and the position of the oil discharge port 19 in the horizontal direction are displaced from each other in a state where the center axis C of the electric motor 50 is inclined.

An oil flow passage when the oil is injected from the oil inlet port 18 in a case where the oil inlet port 18 and the oil discharge port 19 are arranged in the aforementioned positions will be explained below. A first oil passage applied when the center axis C of the electric motor 50 is positioned to be horizontal will be explained with reference to FIGS. 9 and 10 where the arrows are indicated. As illustrated by the arrows in FIG. 9, according to the first oil passage, the oil moves downward along both peripheral sides of the inner peripheral wall surface 111 of the first housing 10. As illustrated by the arrows in FIG. 10, the first oil passage is positioned on a plane perpendicular to the center axis C of the electric motor 50. That is, the oil discharge port 19 is displaced from the first oil passage.

Providing that the oil discharge port 19 is formed on the first oil passage, the oil moving on the first oil passage may be discharged from the oil discharge port 19 before the predetermined amount of oil is stored in the first housing 10. Thus, an operator may wrongly recognize that the predetermined amount of oil is stored because of the discharge of the oil from the oil discharge port 19. However, according to the present embodiment, the oil discharge port 19 is arranged so as to be displaced from the first oil passage. Thus, the oil is inhibited from being discharged from the oil discharge port 19 when the oil injected from the oil inlet port 18 is in the middle of moving downward along the inner peripheral wall surface 111 of the first housing 10. That is, according to the present embodiment, the oil is discharged from the oil discharge port 19 in a state where the oil is stored to the height at which the opening portion of the oil discharge port 19 is formed in the first housing 10. Therefore, according to the present embodiment, the oil is discharged from the oil discharge port 19 when the predetermined amount (i.e., a desired amount) of oil is stored in the first housing 10.

Next, a second oil passage applied when the center axis C of the electric motor 50 is inclined by 4 to 5 degrees relative to the horizontal direction will be explained with reference to FIGS. 9 and 11 where the arrows are indicated. As illustrated by the arrows in FIG. 9, according to the second oil passage, the oil moves downward along both the peripheral sides of the inner peripheral wall surface 111 of the first housing 10. In addition, the oil moves as illustrated by the arrows in FIG. 11. That is, the oil discharge port 19 is displaced from the second oil passage. Therefore, even when the center axis C of the electric motor 50 is inclined relative to the horizontal direction, the oil is also discharged from the oil discharge port 19 at the time when the predetermined amount of oil is stored in the first housing 10.

Figure 12:
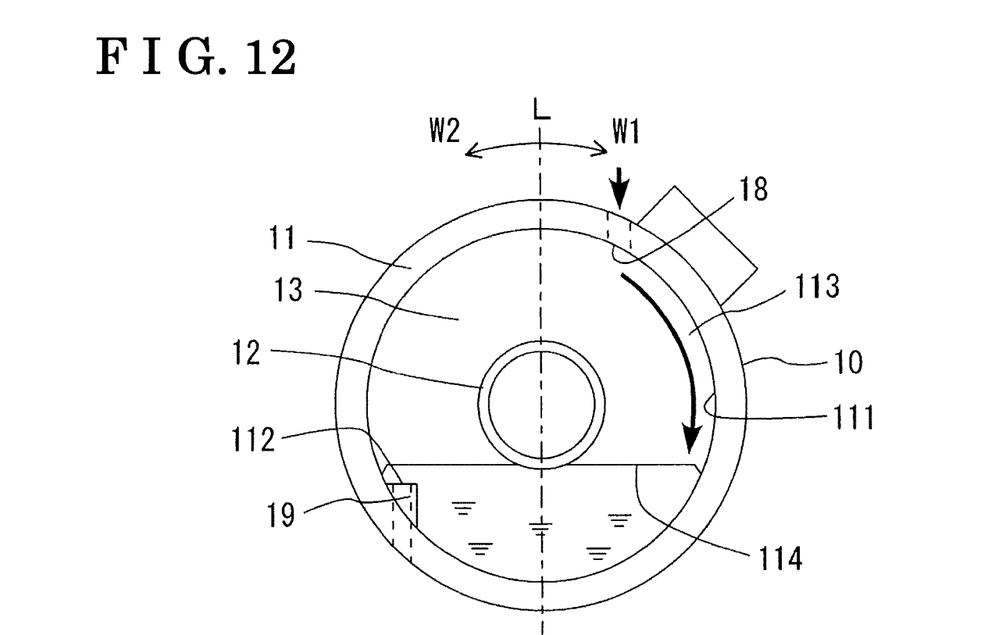
FIG. 12 is a schematic view of the first housing when viewed from the axial direction while illustrating second and third examples of the relative position between the oil inlet port and the oil discharge port.
Figure 13:
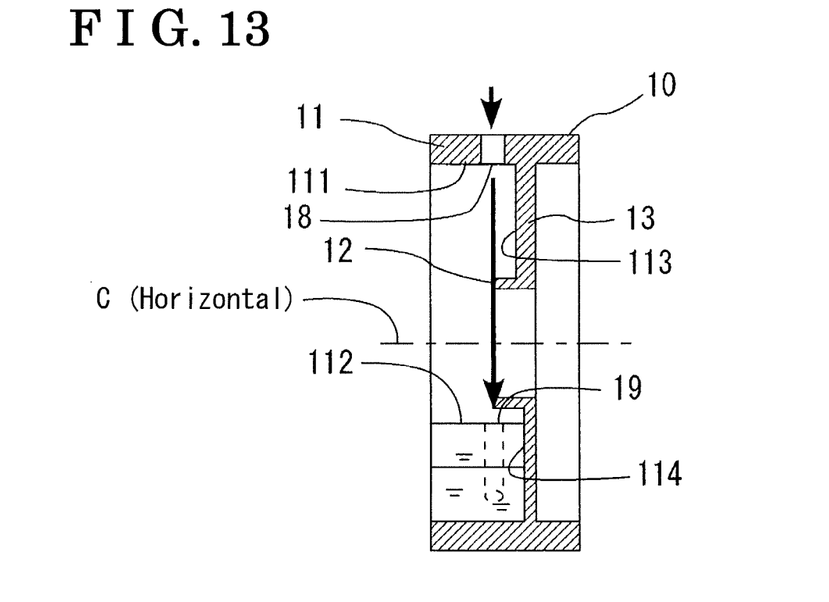
FIG. 13 is an axial cross-sectional view of the first housing illustrated in FIG. 12 in a state where the center axis of the electric motor is positioned to be horizontal according to the second example.
Figure 14:
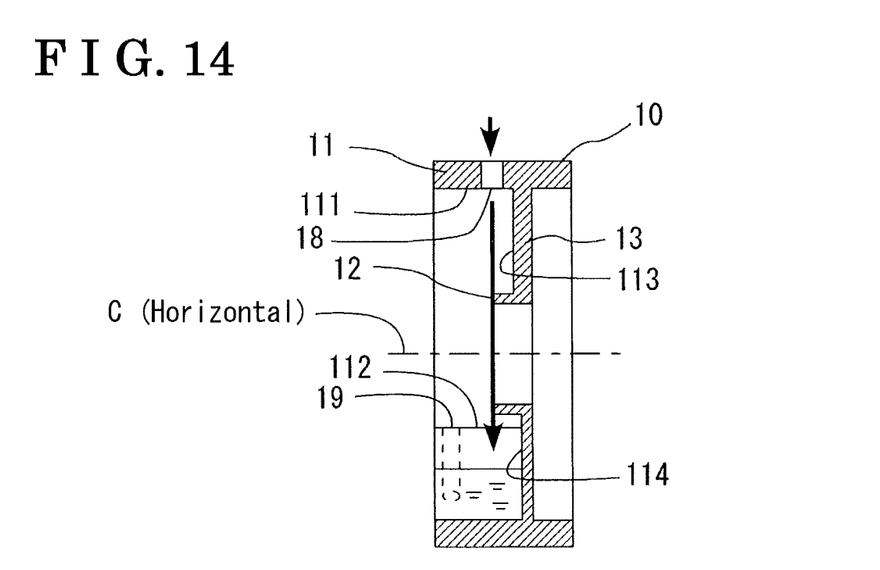
FIG. 14 is an axial cross-sectional view of the first housing illustrated in FIG. 12 in a state where the center axis of the electric motor is positioned to be horizontal according to the third example.

A second example of the relative position between the oil inlet port 18 and the oil discharge port 19 will be explained with reference to FIGS. 12 and 13. In addition, a third example of the relative position between the oil inlet port 18 and the oil discharge port 19 will be explained with reference to FIGS. 12 and 14. In FIGS. 12 to 14, for the easy explanation, the first housing 10 is schematically illustrated. Therefore, the shape of the first housing 10 illustrated in each of FIGS. 12 to 14 may not match the shape of the first housing 10 in FIG. 2.

In the following, the explanation is made in a state where a portion of the first housing 10 perpendicular to or substantially perpendicular to the center axis C of the electric motor 50 is divided into a first area W1 and a second area W2 when the first housing 10 is viewed from the center axis C of the electric motor 50. Specifically, the first area W1 corresponds to a circumferentially first side area relative to a vertical surface L including the center axis C of the electric motor 50 when the first housing 10 is viewed from the center axis C of the electric motor 50. The second area W2 corresponds to a circumferentially second side area relative to the vertical surface L when the first housing 10 is viewed from the center axis C of the electric motor 50. As illustrated in FIG. 12, the oil inlet port 18 is formed in the first area W1 at the inner peripheral wall surface 111 of the first housing 10. On the other hand, the oil discharge port 19 is formed in the second area W2 at the inner peripheral wall surface 111 of the first housing 10.

In the second example, as illustrated in FIG. 13, the oil inlet port 18 and the oil discharge port 19 are arranged at the same positions in the direction of the center axis C in the cross section including the center axis C. On the other hand, as illustrated in FIG. 14, in the third example, the oil inlet port 18 and the oil discharge port 19 are arranged at the different positions in the direction of the center axis C in the cross section including the center axis C.

The oil flow passages when the oil is injected from the oil inlet port 18 in a case where the oil inlet port 18 and the oil discharge port 19 are arranged according to the second and third examples illustrated in FIGS. 12 to 14 will be explained. The first oil passage applied when the center axis C of the electric motor 50 is positioned to be horizontal will be explained with reference to FIG. 12 where arrows are indicated. As illustrated by the arrows in FIG. 12, according to the first oil passage, the oil moves downward along the first area W1 at the inner peripheral wall surface 111 of the first housing 10. On the other hand, the oil discharge port 19 is formed at the second area W2. That is, the oil discharge port 19 is displaced from the first oil passage. Such arrangement of the oil inlet port 18 and the oil discharge port 19 is unrelated to the positions of the oil inlet port 18 and the oil discharge port 19 in the direction of the center axis C as illustrated in FIGS. 13 and 14. Therefore, even when the oil inlet port 18 and the oil discharge port 19 are arranged at the same positions in the direction of the center axis C as illustrated in FIG. 13 or at the different positions in the direction of the center axis C as illustrated in FIG. 14, the oil discharge port 19 is arranged to be displaced from the first oil passage. Accordingly, in a case where the center axis C of the electric motor 50 is positioned to be horizontal, the oil is discharged from the oil discharge port 19 when the predetermined amount of oil is stored in the first housing 10.

According to the second oil passage applied when the center axis C of the electric motor 50 is inclined by 4 to 5 degrees relative to the horizontal direction, as illustrated in FIG. 12, the oil moves downward along the first area W1 at the inner peripheral wall surface 111 of the first housing 10. On the other hand, the oil discharge port 19 is formed at the second area W2. That is, the oil discharge port 19 is displaced from the second oil passage. Accordingly, in a case where the center axis C of the electric motor 50 is inclined relative to the horizontal direction, the oil is discharged from the oil discharge port 19 when the predetermined amount of oil is stored in the first housing 10.

According to the aforementioned embodiment, the rotary electrical apparatus includes the first and second housings 10 and 20, the stator 51 fixed within the first and second housings 10 and 20 and including the center axis C being inclined by the predetermined angle relative to the horizontal direction in a case where the first and second housings 10 and 20 are fixed to the internal combustion engine 2 (the mounting member), the rotor 52 accommodated within the first and second housings 10 and 20 and provided to face the stator 51 in the radial direction of the stator 51, the rotor 52 being rotatable relative to the stator 51 at the center axis C, and the oil D stored at the lower side within the first and second housings 10 and 20 relative to the center axis C of the stator 51 and the rotor 52 and functioning as at least one of the cooling oil, lubricating oil, and operating oil within the first and second housings 10 and 20. The first and second housings 10 and 20 includes the oil inlet port 18 allowing the oil D to be supplied to the first and second housings 10 and 20 and the oil discharge port 19 allowing the oil D to be discharged to the outside of the first and second housings 10 and 20 once the predetermined amount of the oil D is stored within the first and second housings 10 and 20, the oil discharge port 19 being displaced from the first oil passage on which the oil D supplied from the oil inlet port 18 moves downward along the inner peripheral wall surface 111 of the first housing 10 in a state where the first housing 10 (and the second housing 20) is held so that the center axis C of the stator 51 is arranged to be horizontal.

In a case where the oil is initially supplied to the first and second housings 10 and 20, the center axis C of the stator 51 is generally positioned to be horizontal. This is because the assembly of the rotary electrical apparatus, specifically, the assembly of the stator 51 and the rotor 52 relative to the first and second housings 10 and 20 is performed in a state where the center axis C of the stator 51 is positioned to be horizontal. That is, the oil is supplied in a state where the members of the rotary electrical apparatus are assembled on each other. The oil is supplied to the first and second housings 10 and 20 through the oil inlet port 18 in a state where the center axis C of the stator 51 is horizontal. Because the oil discharge port 19 is displaced from the first oil passage in a state where the center axis C of the stator 51 is positioned to be horizontal, the oil is inhibited from being discharged from the oil discharge port 19 when the oil injected through the oil inlet port 18 is in the middle of moving downward along the inner peripheral wall surface 111 of the first housing 10. That is, the oil is discharged from the oil discharge port 19 in a state where the oil is stored in the first and second housings 10 and 20 to the height of the opening portion (the end surface) of the oil discharge port 19. Therefore, the oil is discharged from the oil discharge port 19 when the predetermined amount (i.e., the desired amount) of oil is stored in the first and second housings 10 and 20.

According to the aforementioned embodiment, the oil discharge port 19 is displaced from the second oil passage on which the oil D supplied from the oil inlet port 18 moves downward along the inner peripheral wall surface 111 of the first housing 10 in a state where the first and second housings 10 and 20 are fixed to the internal combustion engine 2 (the mounting member) so that the center axis C of the stator 51 is inclined by the predetermined angle relative to the horizontal direction.

In a case where the rotary electrical apparatus is mounted on the vehicle, for example, the center axis C of the stator 51 may be slightly inclined at a time when the rotary electrical apparatus is settled. Then, when a vehicle inspection is conducted in a state where the rotary electrical apparatus is mounted on the vehicle, the oil may be again injected or supplied to the first and second housings 10 and 20 (at this time, the center axis C of the stator 51 is inclined). Because the oil discharge port 19 is displaced from the second oil passage in a state where the center axis C of the stator 51 is slightly inclined relative to the horizontal direction, the oil is inhibited from being discharged from the oil discharge port 19 when the oil injected through the oil inlet port 18 is in the middle of moving downward along the inner peripheral wall surface 111 of the first housing 10. That is, the oil is discharged from the oil discharge port 19 in a state where the oil is stored in the first and second housings 10 and 20 to the height of the opening portion of the oil discharge port 19. Therefore, the oil is discharged from the oil discharge port 19 when the predetermined amount of oil is stored in the first and second housings 10 and 20 even in the state where the center axis C of the stator 51 is inclined.

Further, according to the aforementioned embodiment, the oil inlet port 18 and the oil discharge port 19 are displaced from each other in the direction of the center axis C of the stator 51.

Accordingly, because the oil inlet port 18 and the oil discharge port 19 are displaced from each other in the direction of the center axis C (i.e., in the axial direction) of the stator 51, the oil is discharged from the oil discharge port 19 when the predetermined amount of oil is stored in the first and second housings 10 and 20.

Furthermore, according to the aforementioned embodiment, the oil discharge port 19 is positioned out of the extension of the straight line extending from the oil inlet port 18 and intersecting with the center axis C of the stator 51 in the state where the first and second housings 10 and 20 are fixed to the internal combustion engine 2 (the mounting member) so that the center axis C of the stator 51 is inclined by the predetermined angle relative to the horizontal direction.

Accordingly, the oil is discharged from the oil discharge port 19 when the predetermined amount of oil is stored in the first and second housings 10 and 20 even in the state where the center axis C of the stator 51 is inclined.

Furthermore, according to the aforementioned embodiment, a portion of the first housing 10 perpendicular to the center axis C of the stator 51 is divided into the first area W1 and the second area W2 being different from the first area W1 in a case where the first housing 10 is viewed from the direction of the center axis C of the stator 51, the oil inlet port 18 being arranged at the first area W1 of the first housing 10 while the oil discharge port 19 being arranged at the second area W2 of the first housing 10.

Accordingly, the oil is discharged from the oil discharge port 19 when the predetermined amount of oil is stored in the first and second housings 10 and 20.

Furthermore, according to the aforementioned embodiment, the rotary electrical apparatus further includes the input shaft 30 rotatably supported by the first and second housings 10 and 20 and receiving the driving force of the internal combustion engine 2.

Accordingly, in a case where the clutch device 60 is accommodated within the first and second housings 10 and 20, the oil D stored in the first and second housings 10 and 20 is configured to function as the operating oil for bringing the clutch device 60 in the connected state and the disconnected state. That is, the rotary electrical apparatus is applicable to a hybrid vehicle including the internal combustion engine and the rotary electrical apparatus each serving as a driving source of the vehicle. The clutch device 60 is used to control a driving force of each of the internal combustion engine and the rotary electrical apparatus. The oil D stored in the first and second housings 10 and 20 may function as the cooling oil for the stator 51, the cooling oil for a bearing rotatably supporting each member relative to the first and second housings 10 and 20, the lubricating oil, or the like, in addition to the operating oil for the clutch device 60.

Furthermore, according to the aforementioned embodiment, the height from the opening portion of the oil discharge port 19 to the surface of the oil D in a state where the first and second housings 10 and 20 are fixed to the internal combustion engine 2 (the mounting member) so that the center axis C of the stator 51 is inclined by the predetermined angle relative to the horizontal direction and the oil D is stored in the first and second housings 10 and 20 while the oil D is dischargeable from the oil discharge port 19 is equal to the reference height defined from the opening portion of the oil discharge port 19 to the surface of the oil D in a state where the first and second housings 10 and 20 are held so that the center axis C of the stator 51 is arranged to be horizontal and the oil D is stored in the first and second housings 10 and 20 while the oil D is dischargeable from the oil discharge port 19.

The oil discharge port 19 is formed in such a manner that the height from the opening portion of the oil discharge port 19 to the surface of the oil D is the same between cases where the oil is injected through the oil inlet port 18 in a state where the first and second housings 10 and 20 are held so that the center axis C of the stator 51 is positioned to be horizontal (i.e., in a horizontal state) and where the oil is injected through the oil inlet port 18 in a state where the first and second housings 10 and 20 are fixed to the internal combustion engine 2 (the mounting member) so that the center axis C of the stator 51 is inclined by the predetermined angle relative to the horizontal direction (i.e., in an inclined state).

Furthermore, according to the aforementioned embodiment, the inner peripheral wall surface 111 of the first housing 10 includes the planar seat surface 112 being positioned at the lower side relative to the center axis C of the stator 51 and the rotor 52, the normal direction of the planar seat surface 112 facing upwardly, and the oil discharge port 19 is formed at the planar seat surface 112.

Accordingly, the position of the oil discharge port 19 is highly accurately defined in the both cases where the center axis C of the stator 51 is in the horizontal state and in the inclined state. As a result, the storage amount of oil D in the early stage of manufacture where the center axis C of the stator 51 is in the horizontal state and the storage amount of oil D at the time of vehicle inspection, for example, where the center axis C of the stator 51 is in the inclined state are securely equalized.

Furthermore, according to the aforementioned embodiment, the planar seat surface 112 is parallel to the center axis C of the stator 51.

In the case of injecting the oil into the first and second housings 10 and 20, the first and second housings 10 and 20 are held so that the center axis C of the stator 51 is horizontal. On the other hand, the center axis C of the stator 51 is inclined by the predetermined angle from the horizontal direction in the state where the first and second housings 10 and 20 are fixed to the internal combustion engine 2. Because the rotary electrical apparatus is configured so that the oil is stored even when the center axis C of the stator 51 is inclined, the center axis C of the stator 51 in the inclined state is close to the horizontal state. Accordingly, in both of the cases where the center axis C of the stator 51 is in the horizontal state and in the inclined state, the amount of oil D in the first and second housings 10 and 20 is highly accurately defined within the predetermined range.

Furthermore, according to the aforementioned embodiment, the first housing 10 includes the axial end wall portion 113 facing the axial end surface of the stator 51, and the axial end wall portion 113 includes the storage recess portion 114 axially extending from the end surface of the axial end wall portion 113, the storage recess portion 114 being arranged at the range for storing the oil D in the first and second housings 10 and 20, the upper boundary of the storage recess portion 114 being formed at the upper side relative to the planar seat surface 112.

Accordingly, even when the volume of oil D increases due to an expansion thereof, the surface of the oil D is specified within the range where the storage recess portion 114 is formed. As a result, an increase of the oil surface is restrained to thereby restrain an efficiency decrease of the rotary electrical apparatus. The height of the storage recess portion 114 defined in the aforementioned manner and the oil discharge port 19 formed at the planar seat surface 112 collectively produce a great effect. That is, because the height of the oil surface before the expansion of the oil D is highly accurately defined, the position of the upper boundary of the storage recess portion 114 is defined so that even when the oil D is expanded, the height of the oil surface is specified within the range of the height of the storage recess portion 114.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotary electrical apparatus comprising:
a housing;
a stator fixed within the housing and including a center axis being inclined by a predetermined angle relative to a horizontal direction in a case where the housing is fixed to a mounting member;
a rotor accommodated within the housing and provided to face the stator in a radial direction of the stator, the rotor being rotatable relative to the stator at the center axis; and
an oil stored at a lower side within the housing relative to the center axis of the stator and the rotor and functioning as at least one of a cooling oil, a lubricating oil, and an operating oil within the housing;
the housing including an oil inlet port allowing the oil to be supplied to the housing and an oil discharge port allowing the oil to be discharged to an outside of the housing once a predetermined amount of the oil is stored within the housing, the oil discharge port being displaced from a first oil passage on which the oil supplied from the oil inlet port moves downward along an inner peripheral wall surface of the housing in a state where the housing is held so that the center axis of the stator is arranged to be horizontal.

2. The rotary electrical apparatus according to claim 1, wherein the oil discharge port is displaced from a second oil passage on which the oil supplied from the oil inlet port moves downward along the inner peripheral wall surface of the housing in a state where the housing is fixed to the mounting member so that the center axis of the stator is inclined by the predetermined angle relative to the horizontal direction.

3. The rotary electrical apparatus according to claim 2, wherein the oil discharge port is positioned out of an extension of a straight line extending from the oil inlet port and intersecting with the center axis of the stator in the state where the housing is fixed to the mounting member so that the center axis of the stator is inclined by the predetermined angle relative to the horizontal direction.

4. The rotary electrical apparatus according to claim 1, wherein the oil inlet port and the oil discharge port are displaced from each other in a direction of the center axis of the stator.

5. The rotary electrical apparatus according to claim 1, wherein a portion of the housing perpendicular to the center axis of the stator is divided into a first area and a second area being different from the first area in a case where the housing is viewed from a direction of the center axis of the stator, the oil inlet port being arranged at the first area of the housing while the oil discharge port being arranged at the second area of the housing.

6. The rotary electrical apparatus according to claim 1, further comprising:
   an input shaft rotatably supported by the housing and receiving a driving force of an internal combustion engine; and
   a clutch device accommodated within the housing and brought in a connected state to connect the rotor and the input shaft to each other and in a disconnected state to disconnect the rotor and the input shaft from each other, wherein the oil functions as the operating oil bringing the clutch device in the connected state and the disconnected state.

7. The rotary electrical apparatus according to claim 1, wherein a height from an end surface of the oil discharge port to a surface of the oil in a state where the housing is fixed to the mounting member so that the center axis of the stator is inclined by the predetermined angle relative to the horizontal direction and the oil is stored in the housing while the oil is dischargeable from the oil discharge port is equal to a reference height defined from the end surface of the oil discharge port to the surface of the oil in a state where the housing is held so that the center axis of the stator is arranged to be horizontal and the oil is stored in the housing while the oil is dischargeable from the oil discharge port.

8. The rotary electrical apparatus according to claim 1, wherein the inner peripheral wall surface of the housing includes a planar seat surface being positioned at a lower side relative to the center axis of the stator and the rotor, a normal direction of the planar seat surface facing upwardly, and the oil discharge port is formed at the planar seat surface.

9. The rotary electrical apparatus according to claim 8, wherein the planar seat surface is parallel to the center axis of the stator.

10. The rotary electrical apparatus according to claim 8, wherein the housing includes an axial end wall portion facing an axial end surface of the stator, and the axial end wall portion includes a storage recess portion axially extending from an end surface of the axial end wall portion, the storage recess portion being arranged at a range for storing the oil in the housing, an upper boundary of the storage recess portion being formed at an upper side relative to the planar seat surface.

* * * * *